United States Patent [19]

Carson

[11] 4,009,095
[45] Feb. 22, 1977

[54] MIXED-PHASE FLUID DISTRIBUTION FOR PACKED CHAMBERS

[75] Inventor: Don B. Carson, Mount Prospect, Ill.
[73] Assignee: UOP Inc., Des Plaines, Ill.
[22] Filed: Jan. 15, 1976
[21] Appl. No.: 649,285

Related U.S. Application Data

[63] Continuation-in-part of Ser. No. 414,555, Nov. 9, 1973, abandoned.

[52] U.S. Cl. .............................. 208/108; 208/146; 252/307; 252/314
[51] Int. Cl.² .................. B01J 13/00; C10G 13/00
[58] Field of Search .......................... 208/108–112, 208/48 AA, 146

[56] References Cited

UNITED STATES PATENTS

| | | | |
|---|---|---|---|
| 3,170,865 | 2/1965 | Allen et al. | 208/48 |
| 3,390,073 | 6/1968 | Godar | 208/48 |
| 3,498,908 | 3/1970 | Frankovich | 208/112 |
| 3,554,897 | 1/1971 | Stanley | 208/48 |
| 3,591,484 | 6/1971 | Peck et al. | 208/48 |
| 3,668,111 | 6/1972 | Dvoracek et al. | 208/48 |
| 3,776,835 | 12/1973 | Dvoracek | 208/48 |

FOREIGN PATENTS OR APPLICATIONS 983,040  2/1965  United Kingdom ................ 208/48

*Primary Examiner*—Delbert E. Gantz
*Assistant Examiner*—G. E. Schmitkons
*Attorney, Agent, or Firm*—James R. Hoatson, Jr.; Robert W. Erickson; William H. Page, II

[57] ABSTRACT

A method for uniformly distributing a mixed-phase fluid intended for contact with a solid particulate catalyst bed disposed in a packed chamber. Foam is generated from the mixed-phase fluid by adding a surface-active agent and a foam stabilizing agent in small concentrations to the mixed-phase and passing the mixture through a zone of turbulence and decreasing pressure prior to the introduction thereof into the packed chamber. Surface-active and foam stabilizing agents are selected to be non-prejudicial to the intended function of the particulate catalyst material.

10 Claims, No Drawings

MIXED-PHASE FLUID DISTRIBUTION FOR PACKED CHAMBERS

CROSS REFERENCE TO RELATED APPLICATION

This application is a continuation-in-part of my application Ser. No. 414,555, filed Nov. 9, 1973, which parent application is now abandoned.

BACKGROUND OF THE INVENTION

1. Field of the Invention

The field of art to which this invention pertains is hydrocarbon processing. Specifically, this invention relates to an improvement in the distribution of a heterogeneous fluid (gas-liquid) over the surface of a solid bed of particulates, disposed in a packed chamber, for the purpose of effecting uniform contact with the particulate bed.

2. Prior Art

Commercial processes abound which involve contacting fluid hydrocarbon and other materials with a confined bed of solid particles for the purpose of physical or chemical treatment of the fluid materials. In many of these processes, the conditions of temperature and pressure, as well as the physical characteristics of the fluids, are such that upon entry onto the particulate bed, they are substantially unvaporized or incompletely vaporized. Such processes include, among others, catalytic hydrocracking of various hydrocarbon oils, hydrodesulfurization of middle distillates, and crude oil clean-up.

In the aforementioned processes it is well known that the stream of fluids entering the contact zone comprises gaseous hydrogen, vaporized hydrocarbons and liquid hydrocarbons. It is desired that these components be intimately admixed and intermingled, as, for example, in a colloidal dispersion. This dispersion must be evenly distributed over the particulate bed so that contact with the bed is uniform. Uniform contact is necessary to utilize the particulates to their maximum efficiency and so effect the desired treatment or conversion of the flowing stream of fluids. Also, it is well known that reactions are encountered in the catalytic environments of the aforementioned processes which are exothermic, and a localized lack of hydrogen can result in regions within the particulate bed of excessively high temperatures and excessive coke deposition upon the particulate catalysts. This results from poor mixing and distribution of the gaseous, vaporous and liquid components of the feed stream. Good mixing and distribution have been found extremely difficult or impossible to achieve in mixed-phase fluid systems. It is typical in the art, because of space velocity and residence time considerations, that the particulate bed be elongated in the direction of flow. This results in contact zones in the form of vertically elongated vessels employing upflow or downflow of fluids. While flow is substantially upward or downward, it can involve segmented lateral paths or radial paths whereby the fluids traverse the particulate bed horizontally and are collected in a centerpipe for exit from the contact vessel. There are many kinds of distributing means utilized to mix and disseminate flow from the inlet point of packed chambers to the particulate beds therein, as, for example, various types of deflecting plates, perforated plates, spray nozzles, etc. However, it has been shown that the usual types of distributing means do not provide uniform flow of a mixed-phase onto the contact bed. There is evidence that the dispersed liquid coalesces rapidly, disassociating itself from the hydrogen, and thereby tending to distribute poorly and channel within the contact zone. Heavier viscous liquids tend to channel down the walls of the contact vessel, whereas less viscous liquids tend to channel in the central region of the particulate bed with the vaporized hydrocarbon and hydrogen. As a result, the temperature within the bed is non-uniform and localized hot spots occur which cause the undesirable results of non-selective hydrocracking and coke deposition.

The present invention solves these prior art problems of poor mixing and distribution. In the embodiments of my invention, the mixed-phase fluid is converted into foam, a homogeneous mixture of the fluid's components which lends itself to even distribution onto the particulate bed.

OBJECTS AND EMBODIMENTS

It is an object of the present invention to improve the distribution of mixed-phase fluids in contact with particulate solids in packed chambers. It is a further object of this invention to improve the utility of the particulate solid used in packed hydroprocessing contact chambers.

Therefore, one embodiment of my invention affords a method for distributing a mixed-phase fluid for contact with a solid bed of particulates which comprises generating foam from the fluid prior to the introduction thereof to said solid bed.

BRIEF SUMMARY OF THE INVENTION

My invention involves an improvement in the distribution of a mixed-phase fluid mixture for contact with a solid bed of particulates. The mixed-phase is changed from a heterogeneous gas-liquid mixture into a homogeneous foam. The fluid is compressed and a surface active agent and a foam stabilizing agent are added. The mixture is partially decompressed, while passing through a turbulent flow region, and the foam is thereby generated just before introduction into the solid bed contact zone.

DETAILED DESCRIPTION OF THE INVENTION

In processes for the chemical conversion or treatment of fluid hydrocarbons or other materials through contact with catalysts, it has become common practice to impregnate the catalytic agent upon a granulated or otherwise particulated solid. This provides extensive surface over which catalyst is available for participation in the desired reactions. These particulated solids are generally disposed in reaction chambers and confined in one or more discrete beds of particulates. The chambers are referred to as packed chambers. Such processes include the hydrotreating and hydrocracking of hydrocarbons for the removal of sulfur and nitrogen and for molecular sieve reduction, using catalysts composed of particles of calcined silica and alumina impregnated with metals such as cobalt, molybdenum and nickel. The operating conditions encountered within the packed beds of such processes are generally found to be within the ranges of: pressures from 800 to 2500 psig; temperatures from 500° to 1000° F.

It is necessary for the utilization of all the particulates in the solid bed, and for satisfactory processing, that the reactants entering a packed chamber distribute themselves evenly over the solid bed in order to pass uniformly therethrough. Where the reactant stream is single-phase, this presents only a problem of directing flow evenly to all areas of the bed surface. However, when reactants are a mixture of gas and liquid phases, it is necessary to assure that both phases are evenly distributed. My invention has as its primary object the improvement of distribution of these mixed phases.

The distribution problem increases in severity as the proportion of unvaporized liquid in the fluid increases, and it becomes acute in heavy oil processes such as hydrocracking or hydrotreating of heavier petroleum oils and residual petroleum fractions. In these processes, the reactant stream comprises hydrogen, vaporized hydrocarbons and liquid hydrocarbons. However, in order to evenly distribute both liquid and gaseous components of a mixed phase, it is necessary to achieve a thorough dispersion of the components within each other. It has been shown that dispersions of liquid and vapor are inherently unstable mixtures. Coalescence takes place, and the materials separate into massive collections of the component phases. My invention affords a method for converting the mixed phase to foam, a thorough and homogeneous dispersion which is process-wise highly desirable.

The use of foam as a vehicle for applying biological and chemical agents to plant life and soil is known in the art, U.S. Pat. No. 3,713,404. However, the utilization of foam according to the process of my invention is a novel, utilitarian and an obvious improvement over the prior art.

Foam can exist in a system either by virtue of the natural physical characteristics of the liquid phase or by characteristics imparted through the addition of certain agents. Life of fluid foam is finite. The walls of bubbles are called laminae, and breakage of laminae equates to destruction of the foam. Interfacial tension and viscosity are the major physical properties of liquid which concern foam stability or longevity. Interfacial tension favors coalescence and bubble destruction through rupture of the laminae, and it is, therefore, a force against foam stability. Viscosity of the liquid in the laminae favors foam stability because it resists thinning of the laminae through draining of liquid away from a site on the bubble. This may occur in the upper bubble wall due to gravitational force or in any site due to abrasion. Many liquids, in particular heavy oils, lend themselves readily to the formation of stable foams due to their inherent high viscosity and low interfacial tension. Where it is desired to generate stable foam from a light oil or a material of low viscosity and high interfacial tension, a surface-active agent and, if necessary, a foam stabilizing agent may be added to the liquid. Surface-active, or foaming agents are used in concentrations from about 100 to 5000 parts per million by weight (ppm.). Foam stabilizers are employed at concentrations in the range of about 50 to 2000 ppm.

Foaming agents to be used in catalytic processes must be inoffensive to the catalyst involved. The following agents, having accomplished their job of foam formation, decompose chemically in the catalytic environments of such processes as hydrocracking of various hydrocarbon oils, hydrodesulfurization of middle distillate and crude oil clean-up. The products of catalytic decomposition of these foaming agents are hydrocarbons, hydrogen sulfide, ammonia and water, compounds which are already in abundance in the aforementioned catalytic environments and which add no danger of harming the catalyst. Foaming agents which are used are:

Ammonia soaps, R—COONH$_4$, where R is an alkyl group of about 11–20 carbon atoms;

Amine soaps R—COONH$_x$R', where R is as defined above, R' is an alkyl group of 1–4 carbon atoms and $x$ is 1–3;

Polyalkylene oxide esters of fatty acids, R—COO(C$_2$H$_4$O)$_n$H, where R is as defined above and $n$ is 3–15;

Ammonium salts of fatty alcohol sulfates, R—O-SO$_3$NH$_4$, where R is as defined above;

Amine salts of fatty alcohol sulfates, R—O—SO$_3$NH$_x$R'$_{(4-x)}$, where R, R' and $x$ are as defined above;

Polyalkylene oxide ethers of fatty alcohols, R—O(C$_2$H$_4$O)$_n$H, where R and $n$ are as defined above;

Ammonium salts of alkylarylsulfonic acids,

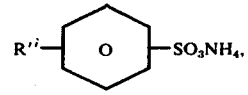

where R'' is a C$_9$ – C$_{18}$ alkyl group;

Amine salts of alkylarylsulfonic acids,

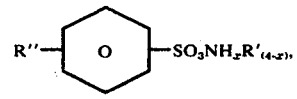

where R', R'' and $x$ are as defined above; and

Polyalkylene oxide ethers of alkylarylphenols,

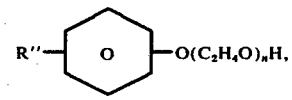

where R'' and $n$ are as defined above.

Foam stabilizing agents increase the stability of foam by increasing the flexibility or toughness of bubble walls. The following compounds are used as foam stabilizing agents without prejudice to the catalyst employed in the aforementioned hydrocarbon processes.

Alkylolamides of fatty acids,

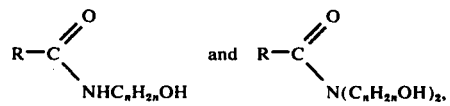

where $n$ is 2 or 3 and R is an alkyl group of about 11–20 carbon atoms.

Formation of foam from a mixed-phase is accomplished by one or both of: desupersaturation of the liquid phase solution of the gas; mechanically induced caviatation of the liquid. The prior art contains teachings of various methods of foam production utilizing pressure variation and cavitation, U.S. Pat. Nos. 2,382,871, 2,020,994, 2,198,585. Reducing pressure on a mixed-phase system results in supersaturation of the liquid by dissolved gas. The liquid desupersaturates by formation of myriad bubbles of the gas within the liquid. These bubbles produce a stable, homogeneous foam in liquids of the proper viscosity and interfacial tension. Mechanical cavitation is cleavage of liquid in the presence of gas whereby bubbles are formed. Cavitation can be induced easily in a mixed-phase process stream by passing the stream through a turbulent flow zone. The necessary cavitation results from turbulence and the interference of the two phases with each other. Such a zone is easily provided by passing a mixed-phase process stream through one or more small orifices. However, in some process units, the reactant conduit is sufficiently non-linear that the degree of turbulence necessary for foam generation is already present. In these units, orifice installation is unnecessary, provided that desupersaturation is not required for foam generation.

An example will illustrate a preferred embodiment of my invention. A single stage, solid bed hydrocracking process unit is used to convert 16,000 barrels per stream day of a mixture of atmospheric and vacuum gas oil to gasoline, jet fuel and diesel fuel. The reactant stream entering the packed chamber consists of 27.7 cu. ft. per second of liquid of 220 molecular weight and 25 cu. ft. per second of vapor of 5.2 molecular weight. The reactants enter the particulate catalyst bed at a temperature of 700° F. and a pressure of 1500 psig. The catalyst in the bed is a solid particulate mass, comprising ⅛ inch diameter spherical particles of a mixture of silica and alumina impregnated with metals, primarily cobalt and molybdenum. This process unit is particularly suited to the use of the present invention. At a point in the reactant conduit situated at least 50 running feet upstream of the packed chamber inlet, a mixture of ammonium N-dodecylate and dodecyl N-ethanolamide is injected into the reactant stream. It is preferable that this long run of conduit contain elbows or other piping fittings to aid in mixing of the injected material with the reactant stream as it flows in the conduit. An amount is injected equivalent to 200 ppm. by weight of ammonium N-dodecylate and 100 ppm. by weight of dodecyl N-ethanolamide, based on the reactant stream. At a point not more than 10 running feet upstream of the packed chamber inlet, an orifice is installed which affords a 10 psi. pressure drop.

Reactants enter the reaction zone of the process unit by being compressed by their respective compressor (gas) and pump (liquid) and are mixed in the reactant conduit. These reactants pass to the injection point of the foaming agent and foam stabilizing agent mentioned above and in the following 40 ft.-long run of conduit, the reactants and agents are thoroughly mixed and pass to the orifice. The drop in pressure and turbulence in the flow stream which result from passage through the orifice generate a foam from the mixed-phase reactant stream. This foam enters the reactor inlet as a homogeneous phase and is evenly distributed upon the solid bed for uniform passage therethrough.

I claim as my invention:

1. In the catalytic treatment of hydrocarbons wherein a mixture of hydrocarbon liquid and a gas is passed through a bed of solid particulate catalyst at conversion conditions, the improvement which comprises generating foam from said mixture and introducing said foam to the bed of solid catalyst.

2. The improvement of claim 1 further characterized in that said foam is generated by alternately compressing and decompressing said mixture while passing it through a zone of turbulent flow.

3. The improvement of claim 1 further characterized in that said foam is generated by adding a surface-active agent to the mixture prior to passing the mixture through a turbulent flow zone.

4. The improvement of claim 3 further characterized in that said foam is generated by adding said surface-active agent and a foam stabilizing agent to said mixture prior to passing it through a turbulent flow zone.

5. The improvement of claim 3 further characterized in that said foam is generated by compressing and adding a surface-active agent to said mixture and decompressing said mixture while passing it through a turbulent flow zone.

6. The improvement of claim 3 further characterized in that said foam is generated by compressing said mixture, adding a surface-active agent and a foam stabilizing agent and decompressing the mixture while passing through a turbulent flow zone.

7. The improvement of claim 6 further characterized in that said surface-active agent is a compound selected from the group consisting of ammonia soaps, amine soaps, polyalkylene oxide esters of fatty acids, ammonium salts of fatty alcohol sulfates, amine salts of fatty alcohol sulfates, polyalkylene oxide ethers of fatty alcohols, ammonium salts of alkylaryl sulfonic acids, amine salts of alkylaryl sulfonic acids, and polyalkylene oxide ethers of alkylaryl phenols.

8. The improvement of claim 6 further characterized in that said foam stabilizing agent is an alkylolamide of a fatty acid.

9. The improvement of claim 7 further characterized in that said surface-active agent is in a concentration of from about 100 to 5000 parts per million by weight and said foam stabilizing agent is an alkylolamide of a fatty acid in a concentration of from about 50 to 2000 parts per million by weight.

10. The improvement of claim 1 further characterized in that the catalytic treatment is a hydrocracking of said hydrocarbon liquid and said gas comprises hydrogen.

* * * * *